Patented Sept. 15, 1931

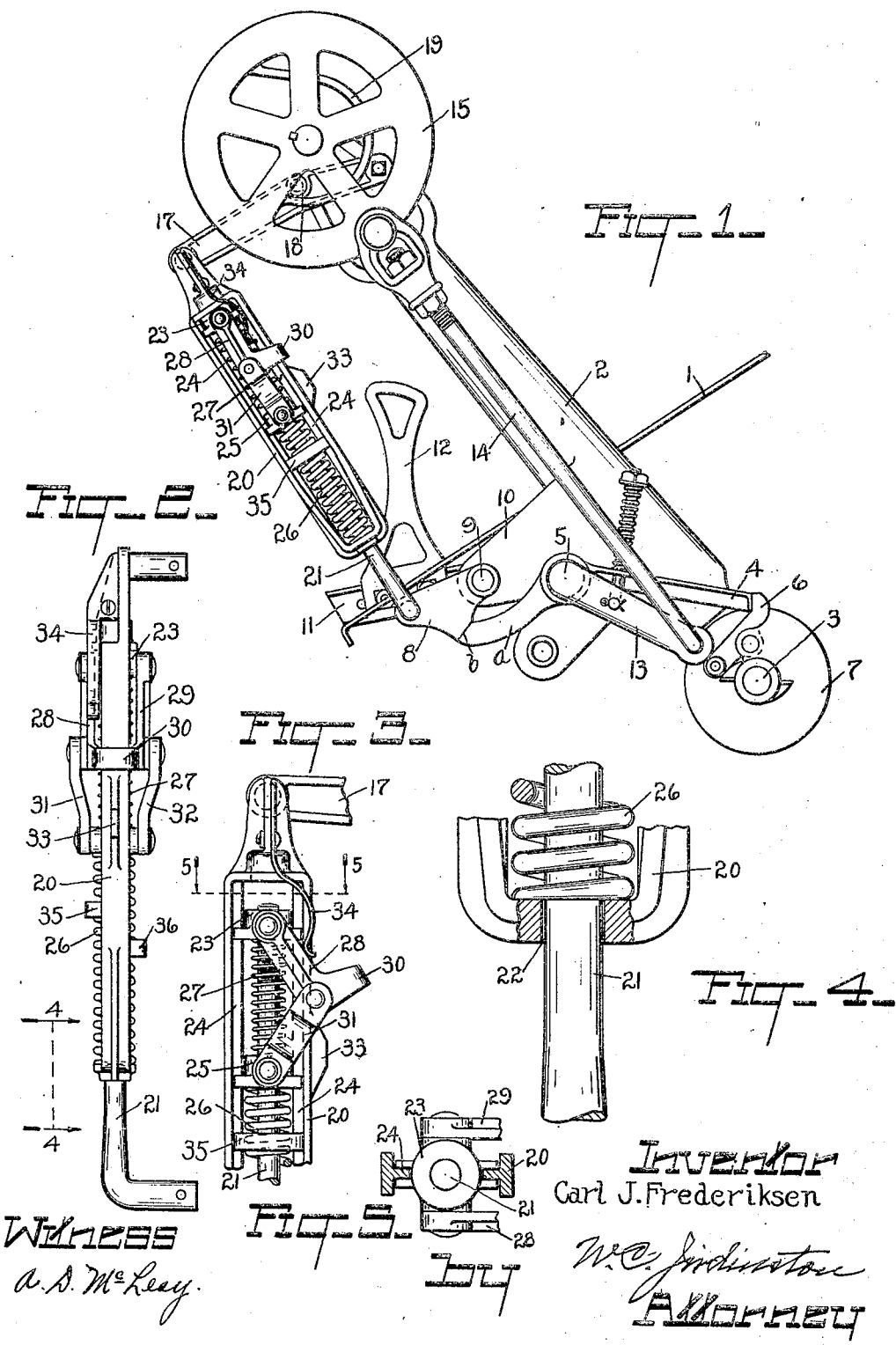

1,823,036

UNITED STATES PATENT OFFICE

CARL J. FREDERIKSEN, OF MOLINE, ILLINOIS, ASSIGNOR TO DEERE & COMPANY, OF MOLINE, ILLINOIS, A CORPORATION OF ILLINOIS

GRAIN HARVESTER

Application filed May 13, 1929. Serial No. 362,561.

My invention relates to grain harvesters and binders and more particularly to the binding mechanism, the invention having for its object to so improve the tripping and compressing operation of the sheaf forming and binding devices that strain of operation of the parts is relieved and a uniformity in the sheaves is assured.

Referring to the drawings in which similar numerals indicate identical parts—

Figure 1 is a front elevation of part of a binding mechanism, sufficient being shown to illustrate the application of my invention;

Figure 2 is an enlarged side view of my improvement;

Figure 3 is an enlarged front view of part of Figure 2 illustrating one position of my improvement;

Figure 4 is an enlarged detail, partly in section on the line 4—4 of Figure 2; and Figure 5 is a detail section on the line 5—5 of Figure 3.

The parts of a binder shown include the deck 1, and the cast standard 2; on the base of the latter the drive shaft 3 is journaled and constantly rotates when the harvester is in operation; power from said shaft to actuate the binding mechanism is held in abeyance by operation of an arm or stop 4 pivotally mounted on the needle shaft 5 and normally in contact with a clutch dog 6 of a clutch 7 of a type well known in the art and commonly employed in harvester binder mechanism. The stop 4 extends stubbleward from the shaft 5, as at a, and contacts with a shoulder b on a member 8 mounted on a trip shaft 9 rockably journaled on an extension 10 forming part of the standard 2. On a bracket 11, on the trip shaft 9, is rigidly mounted a compressor trip arm 12. A crank arm 13, on the needle shaft 5, is connected, by a link 14, with a rotatable wheel 15 journaled on the upper end of the standard 2. The member 8 is connected, by a link device, with a bell crank 17 pivotally attached to the upper end of the standard 2 and provided with a roller 18 adapted to travel over a cam surface 19 on the wheel 15. The construction heretofore described is common in the modern harvester.

The link device includes a cage 20, the upper end thereof being pivotally attached to the bell crank 17. A rod 21 is connected to the member 8 and extends through an opening 22 into the cage 20; the upper end of the rod is threaded and mounted thereon is a block 23 slotted to slidably engage with ribs 24 on the inner sides of the cage 20. The rod 21 moves freely through a similar block 25, and between the latter and the bottom of the cage 20 is located, on the rod 21, a compressor trip spring 26. A lighter spring 27 is employed between the blocks 23 and 25, its power controlling a toggle joint on the front and rear of the cage respectively; the toggle joint consists of an upper part composed of links 28 and 29 pivotally attached respectively to opposite sides of the block 23 and having their lower ends connected by a bridge or follower 30 which extends across one side of the cage 20.

The lower part of the toggle consists of links 31 and 32 pivotally attached respectively to opposite sides of the block 25 and to the links 28 and 29, the pivotal point of attachment to the links 28 and 29 being out of alinement with the pivotal attachment of said links to the block 23 and the pivotal attachment of the links 31 and 32 to the block 25; this arrangement of the toggle pivots providing a lock to hold the toggles in normal position until tripped by a cam 33, on a side of the cage 20, as will be later explained. On the side of the cage 20, and below the bridge or follower 30, is a cam 33. A flat spring 34 is secured on the upper part of the cage 20 to contact with and exert its force against the link 28. Loops 35 and 36, on the cage 20, serve only as a means to offset any tendency of the spring 26 to buckle and also serve to reinforce the sides of the cage 20 by so tying them together.

In the usual operation of a binding mechanism the packers deposit sufficient grain against the arm 12 to rock the shaft 9 and the member 8 so that the stop 4 is raised to release the dog 6; power from the shaft 3 then actuates the needle shaft 5, and the wheel 15, by operation of the crank arm 13 and the link 14, is rotated; the needle rises to tie the bundles at the same time compressing the bundle against the arm 12 which is held up by the bell crank 17, and the connection thereof with the member 8, until the roller 18 disengages from the cam 19 so that the compressor arm drops and the bundle is discharged from the binder; continued rotation of the wheel 15 again engages the roller 18 with the cam 19 and the bell crank and connected parts operate to restore the positions shown in Figure 1. As commonly used, the spring 26 imparts a resilient resistance to the packers, when the bundle is being formed, and to the compressive action of the needle.

It may happen in the harvest that the growth of the grain is irregular and the quantity fed against the arm 12 will be of a greater bulk than common, consequently the needle will be subjected to a greater strain than usual in compressing and tying a bundle. It is desirable that this condition be taken care of to not only ensure tying of a larger bundle but to prevent damage to the binding mechanism, and to that end my improvement is directed and operates as follows:—

It is presumed that a greater than normal quantity of grain has been lodged against the arm 12 by the packers and with enough pressure to rock the trip shaft 9 so that the member 8 will be actuated to disengage the stop 4 from the dog 6 whereby power is received from the shaft 3, in the usual way, to operate the binding and tying mechanism; the wheel 15 is now rotating and the roller 18 is traveling on the cam 19 and holding up the compressor arm 12, against the continued pressure of the needle, by the connection of said arm through the bell crank 17 and connected parts. As the pressure of the needle against the bundle increases the compressor trip arm 12 is rocked and the shaft 9 is rotated so that the member 8, rigidly secured on said shaft, is pulling the rod downwardly against the force of the spring 26. The rod 21 being secured to the block 23, and the toggles 28 and 31 pivotally connected respectively to the block 23 and the block 25 and to each other, with the last point of connection out of alinement with the connection with the blocks, as before stated, it follows that the blocks, the spring 27 and the toggles move downwardly with the compression of the spring 26. At this time the resistance to the pressure of the needle on the bundle is so great that the needle is unable to reach the knotter mechanism and there is danger of injury to the needle and connected parts because of the increasing strain which will persist until relieved. The wheel 15 is still rotating but has not reached that point where the roller 18 is released from the cam 19 so that the bell crank 17 will drop and with it the parts connecting it with the compressor arm 12.

To give relief to the above conditions my device functions by the bridge or follower 30 in the toggle 28 riding up on the cam 33 until the "by the center" lock of the toggles is broken, as shown in Figure 3, the compression of the spring is relieved sufficiently to permit the arm 12 to give still further to the pressure of the bundle and at the same time allow the needle to reach the knotter device and operate to bind the bundle. After the knot is tied the needle movement is reversed and simultaneously the roller 18 is disengaged from the cam 19 and the bell crank 17 is free to rock on its pivot, whereby the parts connecting the crank with the compressor shaft quickly drop by gravity and the compressor arm falls so that the bound bundle is free to be ejected from the binder deck to fall upon the ground or upon a carrier; the wheel 15 is still rotating, however, until the roller 18 is again in contact with the cam 19 and the bell crank 17 and parts connecting it with the compressor trip mechanism are again in position as shown in Figure 1, and the force of the spring 27 has returned the toggles to their primal locked position, the action of the spring 27 being reinforced by a flat spring 37, secured to the cage 20, with its free end bearing on the part 28 of the toggle.

It will be noticed that the spring 27 exerts no force upon the spring 26 but is only utilized to return the toggle to its locked position and hold it there until it is tripped by the cam 33. My device has proven most efficient in affording relief when and where it is most needed in the varying conditions of the harvest.

What I claim is:—

1. In a harvester, the combination of the binding mechanism including a compressor trip arm against which grain is accumulated and compressed to form a bundle, means to hold said arm in receiving position until a normal sized bundle is formed and bound, said means further operating to release said arm to drop for ejection of the bound bundle, and operative to permit said arm to recede while in receiving position when a supernormal quantity of grain is compressed against it.

2. In a harvester, the combination of the binding mechanism including a compressor trip arm against which grain is accumulated and compressed to form a bundle, means to hold said arm in receiving position until a normal sized bundle is formed and bound, said means further operating to release said arm to drop for ejection of the bound bundle, and means operative to permit said arm to recede for a limited distance while in receiving position when a supernormal quantity of grain is accumulated and compressed against it.

3. In a harvester, the combination of the binding mechanism including a compressor trip arm against which grain is accumulated and compressed to form a bundle mechanism operating to hold said arm in receiving position until a normal sized bundle is formed and bound, and further operating to release said arm to drop for ejection of the bundle, and means operative to momentarily slow the releasing operation.

4. In a harvester, the combination of the binding mechanism including a cage and a compressor trip arm, means within said cage connected with said arm and compressively operative to trip said arm, and means to momentarily slow the compressive action pending the completion of the tripping operation.

5. In a harvester, the combination of the binding mechanism including a cage and a compressor trip arm, a rod longitudinally movable in said cage and connected with the compressor trip arm, a spring on said rod compressively actuable to trip said arm, a lighter spring of lesser tension on said rod above the compressor spring and inactive during the primal actuation of the compressor spring, and means to trip said lighter spring to momentarily slow the actuation of the compressor spring.

6. In a harvester, the combination of the binding mechanism including a cage and a compressor trip arm, a rod longitudinally movable in said cage and connected with the compressor trip arm, a spring on said rod compressively actuable to trip said arm, a lighter spring of lesser tension on said rod above the compressor spring and normally inactive during the primal actuation of the compressor spring, means to trip said lighter spring to momentarily slow the actuation of the compressor spring, and means to return said lighter spring to inactive position when said arm is tripped.

7. In a harvester, the combination of the binding mechanism including a cage, a trip rod longitudinally movable in said cage, a block on the upper end of said rod, a similar block intermediate the ends of the cage and on the rod and longitudinally movable relative to the cage and the rod, a trip spring between the movable block and the bottom of the cage, a second spring of lesser tension between the blocks, toggle members pivotally connected to said blocks and to each other, the latter pivotal connection being normally out of alinement with the pivotal connections to said blocks to form a lock, and means on the cage and one of said toggle members co- operating to break said lock by downward motion of the rod.

8. In a harvester, the combination of the binding mechanism including a cage, a trip rod slidable in said cage, a block mounted on the upper end of said rod, a similar block intermediate the ends of the cage and on the rod and longitudinally movable relative to the cage and the rod, a trip spring between the movable block and the bottom of the cage, toggle members pivotally connected to said blocks and to each other, the latter pivotal connection being normally out of alinement with the pivotal connections to said blocks to form a lock, means on the cage cooperating with means on one of said toggle members to break said lock by downward motion of said rod, a second spring on the rod between said blocks and of lesser tension than the trip spring, and operating to restore said toggle members to locked position.

9. In a harvester, the combination of a binding mechanism including a compressor trip arm, means to hold said arm in normal upright position and operative to release said arm to fall, said means comprising a cage, a trip rod longitudinally movable therein and connected with said arm, a block on the upper end of said rod, a block slidably mounted within said cage and through which said rod is lengthwise movable, a trip spring between the slidable block and the lower end of the cage, toggle members pivotally connected to said blocks and to each other and normally out of alinement to form a lock, a cam on the cage with which one of said toggle members is adapted to engage to break said lock and allow the trip arm to recede from the pressure of a supernormal accumulation of grain, and a spring between said blocks operating to restore said toggle members to their normal locked position.

10. In a grain binder having binding mechanism, a movable compressor trip arm against which grain is accumulated and compressed to form a bundle, means for causing said arm to offer increasing resistance to movement as it is moved, means responsive to said arm being moved to a predetermined position for initiating the operation of the binding mechanism, means for freeing said arm at the completion of the operation of the binding mechanism to permit the discharge of the bundle, and means for substantially reducing the resistance offered to further movement of said arm when said arm is moved to a certain position beyond said predetermined position before the completion of the operation of said binding mechanism.

11. In a grain binder having binding mechanism, a movable compressor trip arm against which grain is accumulated and compressed to form a bundle, a spring, connections between said arm and spring through which movement of said arm compresses said spring, means responsive to said arm being moved to a predetermined position for initiating the operation of the binding mechanism, means for freeing said arm at the completion of the operation of the binding mechanism to permit the discharge of the bundle, and means for releasing said spring when said arm is moved to a certain position beyond said predetermined position before the completion of the operation of said binding mechanism.

12. In a grain binder having binding mechanism, a movable compressor trip arm against which grain is accumulated and compressed to form a bundle, a spring, connections between said arm and spring through which movement of said arm compresses said spring, means responsive to said arm being moved to a predetermined position for initiating the operation of the binding mechanism, means for freeing said arm at the completion of the operation of the binding mechanism to permit the discharge of the bundle, said connections including a toggle linkage normally positioned nearly on dead center and through which compression force is transmitted to said spring, and means for breaking said toggle when said arm is moved beyond said predetermined position before the completion of the operation of said binding mechanism.

13. In a grain binder having binding mechanism, a movable compressor trip arm against which grain is accumulated and compressed to form a bundle, a spring, connections between said arm and spring through which movement of said arm compresses said spring, means responsive to said arm being moved to a predetermined position for initiating the operation of the binding mechanism, means for freeing said arm at the completion of the operation of the binding mechanism to permit the discharge of the bundle, said connections including a toggle linkage normally positioned nearly on dead center and through which compression force is transmitted to said spring, means for breaking said toggle when said arm is moved beyond said predetermined position before the completion of the operation of said binding mechanism, and means for restoring said toggle to its normal near dead center position when the force moving said arm is removed.

14. A compressor trip arm controlling mechanism for grain binders comprising two relatively movable members, means for causing increasing resistance to movement as said members are moved relatively to each other in one direction, and means for substantially reducing the resistance offered to further movement when said members have been moved relatively to each other to a certain position.

15. A compressor trip arm controlling mechanism for grain binders comprising two relatively movable members, connections including a spring and a toggle linkage normally positioned nearly on dead center in serial relation connecting said members, said spring functioning to apply through said toggle linkage a yielding resistance to movement of one of said members relatively to the other, and means for breaking said toggle when said spring is stressed to a predetermined degree.

CARL J. FREDERIKSEN.

CERTIFICATE OF CORRECTION.

Patent No. 1,823,036.                                              Granted September 15, 1931, to

CARL J. FREDERIKSEN.

It is hereby certified that error appears in the above numbered patent requiring correction as follows: In the grant, the name of the patentee was erroneously written as "Carl J. Frederieksen", instead of Carl J. Frederiksen; page 2, line 120, claim 1, before "operative" insert the word means; page 3, line 10, claim 3, insert a comma after "bundle"; and that the said Letters Patent should be read with these corrections therein that the same may conform to the record of the case in the Patent Office.

Signed and sealed this 3rd day of November, A. D. 1931.

(Seal)                                                                   M. J. Moore,
                                                                          Acting Commissioner of Patents.